United States Patent
Kinnunen et al.

(10) Patent No.: US 8,681,727 B2
(45) Date of Patent: Mar. 25, 2014

(54) FLEXIBLE RADIO CHANNEL SOUNDING

(75) Inventors: Pasi Eino Tapio Kinnunen, Oulu (FI); Kari J. Hooli, Oulu (FI); Kari P. Pajukoski, Oulu (FI); Esa T. Tiirola, Kempele (FI); Mauri J. Nissila, Oulu (FI)

(73) Assignee: Nokia Corporation, Espoo (FI)

( * ) Notice: Subject to any disclaimer, the term of this patent is extended or adjusted under 35 U.S.C. 154(b) by 161 days.

(21) Appl. No.: 13/354,564

(22) Filed: Jan. 20, 2012

(65) Prior Publication Data

US 2013/0189930 A1 Jul. 25, 2013

(51) Int. Cl.
H04W 4/00 (2009.01)

(52) U.S. Cl.
USPC ............. 370/329; 370/330; 455/509

(58) Field of Classification Search
USPC .................. 370/329, 330; 455/509
See application file for complete search history.

(56) References Cited

U.S. PATENT DOCUMENTS

| | | | |
|---|---|---|---|
| 8,432,994 B2 * | 4/2013 | Hou et al. .............. | 375/267 |
| 2009/0181687 A1 | 7/2009 | Tiirola et al. ............ | 455/450 |
| 2010/0040036 A1 | 2/2010 | Ofuji et al. .............. | 370/344 |
| 2010/0067512 A1 | 3/2010 | Nam et al. ............... | 370/342 |
| 2010/0285792 A1 | 11/2010 | Chen et al. ............. | 455/422.1 |
| 2011/0158191 A1 | 6/2011 | Zhang et al. ........... | 378/329 |
| 2011/0171964 A1 | 7/2011 | Lin et al. ................ | 455/450 |
| 2011/0235682 A1 | 9/2011 | He et al. ................. | 375/132 |
| 2011/0286548 A1 | 11/2011 | Safavi et al. ........... | 375/295 |
| 2011/0310818 A1 | 12/2011 | Lin et al. ................ | 370/329 |

FOREIGN PATENT DOCUMENTS

| WO | WO 2009/023692 A2 | 2/2009 |
|---|---|---|
| WO | WO 2010/018977 A2 | 2/2010 |
| WO | WO 2011/005163 A1 | 1/2011 |
| WO | WO-2011/075908 A1 | 6/2011 |
| WO | WO-2011/100466 A2 | 8/2011 |

OTHER PUBLICATIONS

Nokia Siemens Networks, Nokia; "On Uplink Sounding Enhancements for CoMP"; 3GPP TSG RAN WG1 Meeting #68, R1-120728; Feb. 6-10, 2012; Dresden, Germany; whole document (3 pages).

Nokia Siemens Networks, Nokia; "On Reference Signal Enhancements for UL CoMP"; 3GPP TSG RAN WG1 Meeting #67, R1-114324; Nov. 14-18, 2011;San Francisco, USA; whole document (6 pages).

(Continued)

*Primary Examiner* — Creighton Smith
(74) *Attorney, Agent, or Firm* — Harrington & Smith (57) ABSTRACT

A method includes determining a base sequence, cyclic shift, and UE-specific portion of a frequency comb, applying the cyclic shift to the base sequence to create a shifted sequence, and selecting a portion of the shifted sequence as a user equipment-specific SRS. The selected portion of the shifted sequence corresponds to the portion of the frequency comb. A second method includes assigning a cyclic shift and a UE-specific portion of a frequency comb to a UE, where the cyclic shift is for use by the UE to apply the cyclic shift to the determined base sequence to create a shifted sequence. The portion of the frequency comb is for the UE to select a portion of the shifted sequence for SRS. The method includes transmitting indications of the base sequence, the cyclic shift, and the portion of the frequency comb. Auxiliary DMRS may be provided using SRS resources.

29 Claims, 8 Drawing Sheets

(56) References Cited

OTHER PUBLICATIONS

"3rd Generation Partnership Project; Technical Specification Group Radio Access Network; Evolved Universal Terrestrial Radio Access (E-UTRA); Physical Channels and Modulation (Release 8)", 3GPP TS 36.211 V8.9.0, Dec. 2009, 83 pgs.

"3rd Generation Partnership Project; Technical Specification Group Radio Access Network; Evolved Universal Terrestrial Radio Access (E-UTRA); Physical Channels and Modulation (Release 9)", 3GPP TS 36.211 V9.1.0, Mar. 2010, 85 pgs.

"3rd Generation Partnership Project; Technical Specification Group Radio Access Network; Evolved Universal Terrestrial Radio Access (E-UTRA); Physical Channels and Modulation (Release 10)", 3GPP TS 36.211 V10.2.0, Jun. 2011, 103 pgs.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300 V8.12.0, Mar. 2010, 149 pgs.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9)", 3 GPP TS 36.300 V9.7.0, Mar. 2011, 174 pgs.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", 3GPP TS 36.300 V10.4.0, Jun. 2011, 194 pgs.

"3rd Generation Partnership Project; Technical Specification Group Radio Access Network; Requirements for further advancements for Evolved Universal Terrestrial Radio Access (E-UTRA) (LTE-Advanced) (Release 8)", 3GPP TR 36.913 V8.0.1, Mar. 2009, 15 pgs.

"3rd Generation Partnership Project; Technical Specification Group Radio Access Network; Requirements for further advancements for Evolved Universal Terrestrial Radio Access (E-UTRA) (LTE-Advanced) (Release 9)", 3GPP TR 36.913 V9.0.0, Dec. 2009, 15 pgs.

"3rd Generation Partnership Project; Technical Specification Group Radio Access Network; Requirements for further advancements for Evolved Universal Terrestrial Radio Access (E-UTRA) (LTE-Advanced) (Release 10)", 3GPP TR 36.913 V10.0.0, Mar. 2011, 15 pgs.

"3rd Generation Partnership Project; Technical Specification Group Radio Access Network; Further Advancements for E-UTRA Physical Layer Aspects (Release 9)", 3GPP TR 36.814 V0.4.1, Feb. 2009, 31 pgs.

"Work Item Description for 'Enhanced DL transmission for LTE'", CMCC, TSG-RAN Meeting #43, RP-090359, Mar. 2009, 5 pgs.

"Considerations on Initialization and Mapping of DM-RS Sequence", Nokia Siemens Networks et al., 3GPP TSG RAN WGI #58bis Meeting, R1-093890, Oct. 2009, 5 pgs.

"CR 36.211 Introduction of enhanced dual layer transmission", Change Request, 3GPP TSG-RAN WGI Meeting #59, R1-095131, Nov. 2009, 7 pgs.

"Proposed Way forward on Rel-9 Dual-layer beamforming for TDD and FDD", Alcatel-Lucent, et al., 3GPP TSG RAN WGI meeting #58, R1-093697, Aug. 2009, 3 pgs.

Sesia et al., "LTE—The UMTS Long Term Evolution: From Theory to Practice", ch.15 and 16, "Uplink Reference Signals", pp. 345-375, 2009.

Nissila et al., U.S. Appl. No. 13/289,118, filed Nov. 4, 2011, entitled "DMRS Arrangements for Coordinated Multi-Point Communication".

3GPP TS 36.331 V10.3.0, "3rd Generation Partnership Project; Technical Specification Group Radio Access Network; Evolved Universal Terrestrial Radio Access (E-UTRA); Radio Resource Control (RRC); Protocol specification (Release 10)", Sep. 2011, 296 pgs.

* cited by examiner

FLEXIBLE RADIO CHANNEL SOUNDING

TECHNICAL FIELD

This invention relates generally to wireless communication and, more specifically, relates to uplink reference signals.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

The following abbreviations that may be found in the specification and/or the drawing figures are defined as follows:

3GPP third generation partnership project
BS base station
BW bandwidth
CM cubic metric
CoMP coordinated multi-point
CQI channel quality indication
CRS common reference signal
CS cyclic shift
CSI channel state information
DL downlink (eNB towards UE)
DM RS demodulation reference signal (also referred to as DMRS)
eNB E-UTRAN Node B (evolved Node B)
E-UTRAN evolved UTRAN (LTE)
FDM frequency division multiplexing
FDMA frequency division multiple access
IFDM interleaved frequency-division multiplexing
LTE long term evolution of UTRAN (E-UTRAN)
LTE-A LTE advanced
MIMO multiple input multiple output
MU-MIMO multi-user multiple input multiple output
Node B base station
OFDM orthogonal frequency division multiplexing
OFDMA orthogonal frequency division multiple access
PDCCH packet downlink control channel
PRB physical resource block
PUCCH physical uplink control channel
PUSCH physical uplink shared channel
RAN1 technical specification group radio access network working group 1
RB resource block
Rel release
RPF repetition factor
RRC radio resource control
RRH remote radio head
RRM radio resource management
RS reference signal
SC FDMA single carrier, frequency division multiple access
SRS sounding reference signal
SU MIMO single-user MIMO
TDM time division multiplexing
UE user equipment, such as a mobile station, mobile node or mobile terminal
UL uplink (UE towards eNB)
UMTS universal mobile telecommunications system
UTRAN universal terrestrial radio access network
ZC Zadoff-Chu Modern wireless systems such as cellular systems use a number of reference signals (RSs), e.g., for data demodulation and channel sounding. Two important signals used in uplink are demodulation reference signals (DM RS or DMRS) and sounding reference signals (SRS). DM RS are primarily used for channel estimation for coherent demodulation, while the SRS are primarily used to channel quality determination, e.g., to enable frequency-selective scheduling. See Sesia et al., "LTE—The UMTS Long Term Evolution: From Theory to Practice", ch. 16, "Uplink Reference Signals", pp. 359-375 (2009), which also explains these signals in much more detail.

In particular, SRS is an important signal, allowing for link adaptation and frequency domain packet scheduling in the uplink, uplink timing estimation as well as precoder selection related to SU-MIMO. Furthermore, due to channel reciprocity in TDD, SRS can be utilized for DL link adaptation and precoding as well. The importance of SRS is further increasing in both UL and DL sides due to introduction of Coordinated Multi-point (CoMP) in LTE Rel-11.

With regard to CoMP, CoMP transmission is currently being investigated in 3GPP RAN1. The motivation for CoMP is to allow fast coordination among different transmission points to improve coverage of high data rate, cell-edge throughput, and/or to increase system throughput. To enable closed-loop transmission from multiple transmission points to a given UE, CSI for multiple radio links is measured by the UE and sent to the network using an uplink control channel (PUCCH) or an uplink data channel (PUSCH).

A UE in a CoMP scenario may be attached to a serving eNB and may communicate with that eNB for UL control (PUCCH), uplink data (PUSCH), and/or DL control (PDCCH) channels. For CoMP transmission, the UE can receive joint transmissions (PDSCH) from the serving eNB and/or one or more non-serving eNBs (e.g., from overlapping cells).

Uplink CoMP reception implies reception of the UE's transmitted signals at multiple geographically separated or co-located points (e.g., a single UE transmitting to multiple eNBs). In the DL direction where the eNB transmits data to the UE, DL CoMP transmission implies dynamic coordination among multiple geographically separated transmission points. Examples of DL CoMP schemes include coordinated beamforming where the data to a single UE is instantaneously transmitted from one of the transmission points and the scheduling decisions are coordinated to control, for example, the interference generated in a set of coordinated cells. In coordinated scheduling and coordinated beamforming, the data may only be available at a serving eNB and transmission scheduling may be coordinated among eNBs within the CoMP cooperating set.

It can be seen that RSs such as SRS serve important purposes in situations such as CoMP. For instance, in uplink, signals from one UE are now being transmitted to many eNBs (e.g., as opposed to a previously conventional UE-to-single-eNB communication). Current SRSs may not provide the flexibility or number of RSs available in these and similar situations.

SUMMARY

The below summary section is intended to be merely exemplary and non-limiting.

In an exemplary embodiment, a method includes determining, by a user equipment, a base sequence, a cyclic shift, and a user equipment-specific portion of a frequency comb, and applying, by the user equipment, the determined cyclic shift to the determined base sequence to create a shifted sequence. The method includes selecting a portion of the shifted sequence as a user equipment-specific sounding reference sequence, where the selected portion of the shifted sequence corresponds to the user equipment-specific portion of the frequency comb.

In another exemplary embodiment, an apparatus includes means for determining a base sequence, a cyclic shift, and a user equipment-specific portion of a frequency comb; means for applying, by the user equipment, the determined cyclic shift to the determined base sequence to create a shifted sequence; and means for selecting a portion of the shifted sequence as a user equipment-specific sounding reference sequence, where the selected portion of the shifted sequence corresponds to the user equipment-specific portion of the frequency comb.

In a further exemplary embodiment, an apparatus includes one or more processors and one or more memories including computer program code, the one or more memories and the computer program code being configured to, with the one or more processors, cause the apparatus at least to perform: determining a base sequence, a cyclic shift, and a user equipment-specific portion of a frequency comb; applying the determined cyclic shift to the determined base sequence to create a shifted sequence; and selecting a portion of the shifted sequence as a user equipment-specific sounding reference sequence, where the selected portion of the shifted sequence corresponds to the user equipment-specific portion of the frequency comb.

In another exemplary embodiment, a computer program product comprises a computer-readable medium bearing computer program code embodied therein for use with a computer, the computer program code comprising: code for determining, by a user equipment, a base sequence, a cyclic shift, and a user equipment-specific portion of a frequency comb; code for applying, by the user equipment, the determined cyclic shift to the determined base sequence to create a shifted sequence; and code for selecting a portion of the shifted sequence as a user equipment-specific sounding reference sequence, where the selected portion of the shifted sequence corresponds to the user equipment-specific portion of the frequency comb.

In a further exemplary embodiment, a method includes assigning, by a base station, a cyclic shift and a user equipment-specific portion of a frequency comb to a user equipment, where the cyclic shift is for use by the user equipment to apply the cyclic shift to the determined base sequence to create a shifted sequence, and where the user equipment-specific portion of the frequency comb is for use by the user equipment at least to select a portion of the shifted sequence as a user equipment-specific sounding reference sequence. The method also includes transmitting, from the base station to the user equipment, indications of the base sequence, the cyclic shift, and the user equipment-specific portion of the frequency comb.

In an additional exemplary embodiment, an apparatus includes means for assigning, by a base station, a cyclic shift and a user equipment-specific portion of a frequency comb to a user equipment, where the cyclic shift is for use by the user equipment to apply the cyclic shift to the determined base sequence to create a shifted sequence, and where the user equipment-specific portion of the frequency comb is for use by the user equipment at least to select a portion of the shifted sequence as a user equipment-specific sounding reference sequence; and means for transmitting, from the base station to the user equipment, indications of the base sequence, the cyclic shift, and the user equipment-specific portion of the frequency comb.

In a further exemplary embodiment, an apparatus includes one or more processors and one or more memories including computer program code, the one or more memories and the computer program code being configured to, with the one or more processors, cause the apparatus at least to perform: assigning, by a base station, a cyclic shift and a user equipment-specific portion of a frequency comb to a user equipment, where the cyclic shift is for use by the user equipment to apply the cyclic shift to the determined base sequence to create a shifted sequence, and where the user equipment-specific portion of the frequency comb is for use by the user equipment at least to select a portion of the shifted sequence as a user equipment-specific sounding reference sequence; and transmitting, from the base station to the user equipment, indications of the base sequence, the cyclic shift, and the user equipment-specific portion of the frequency comb.

In another exemplary embodiment, a computer program product comprises a computer-readable medium bearing computer program code embodied therein for use with a computer, the computer program code comprising: code for assigning, by a base station, a cyclic shift and a user equipment-specific portion of a frequency comb to a user equipment, where the cyclic shift is for use by the user equipment to apply the cyclic shift to the determined base sequence to create a shifted sequence, and where the user equipment-specific portion of the frequency comb is for use by the user equipment at least to select a portion of the shifted sequence as a user equipment-specific sounding reference sequence; and code for transmitting, from the base station to the user equipment, indications of the base sequence, the cyclic shift, and the user equipment-specific portion of the frequency comb.

DETAILED DESCRIPTION OF THE DRAWINGS

Figure 1:
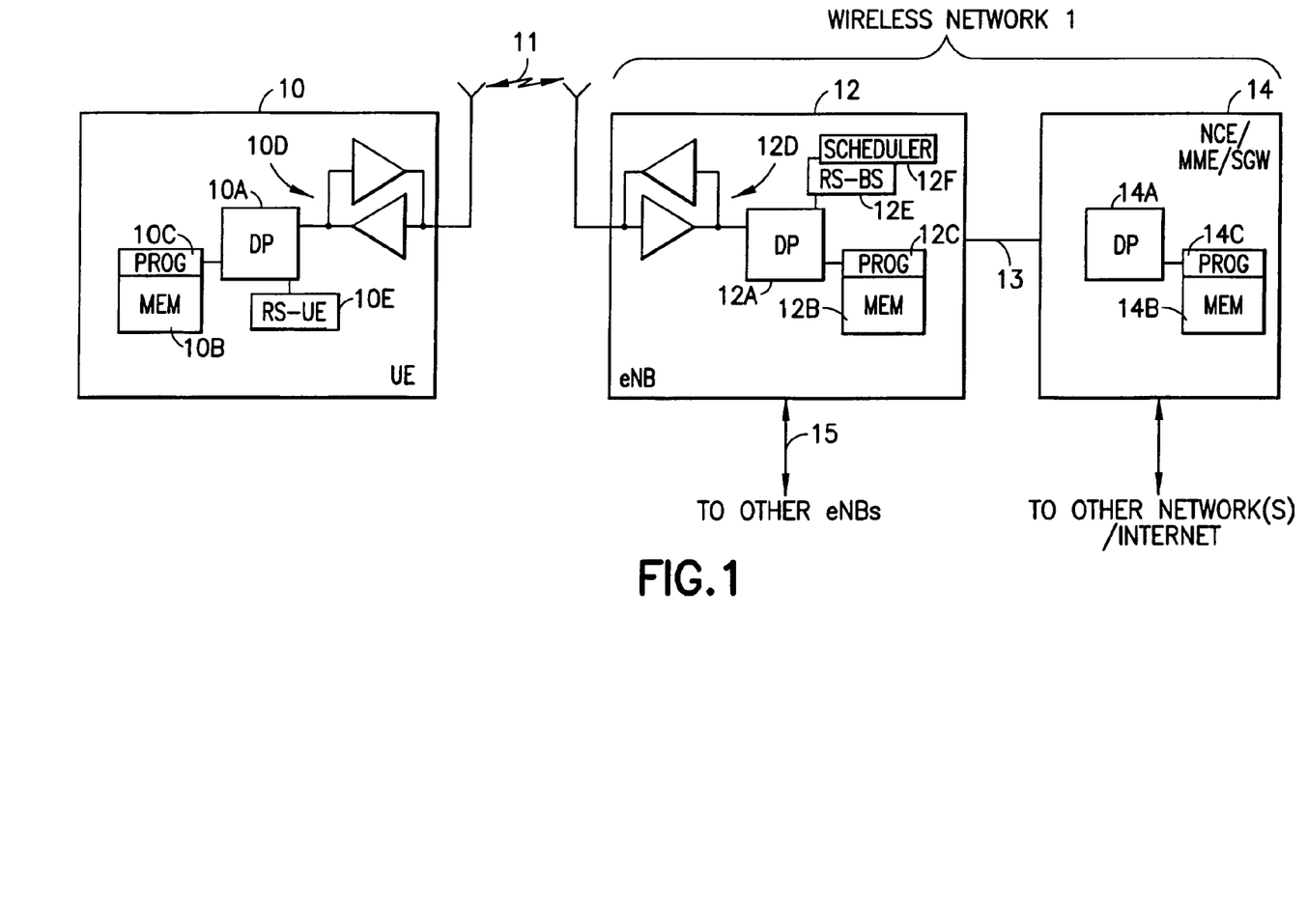
FIG. 1 shows a simplified block diagram of various exemplary electronic devices that are suitable for use in practicing the exemplary embodiments of this invention.

Before describing in further detail the exemplary embodiments of this invention, reference is made to FIG. 1 for illustrating a simplified block diagram of various exemplary electronic devices and apparatus that are suitable for use in practicing the exemplary embodiments of this invention. In FIG. 1, a wireless network 1 is adapted for communication over a wireless link 11 with an apparatus, such as a mobile communication device which may be referred to as a user equipment (UE) 10, via a network access node, such as a Node B (base station), and more specifically an eNB 12. The network 1 may include a network control element (NCE) 14 that may include the MME (mobility management entity)/SGW (serving gateway) functionality, and which provides connectivity with one or more other networks, such as a telephone network and/or a data communications network (e.g., the Internet). The UE 10 includes a controller, such as data processor (DP) 10A (e.g., a computer, one or more processors), a computer-readable memory medium embodied as a memory (MEM) 10B that stores a program of computer instructions (PROG) 10C, and a suitable radio frequency (RF) interface 10D for bidirectional wireless communications with the eNB 12 via one or more antennas.

The eNB 12 includes a controller, such as a data processor (DP) 12A (e.g., computer, or one or more processors), a computer-readable memory medium embodied as a memory (MEM) 12B that stores a program of computer instructions (PROG) 12C, and a suitable radio frequency (RF) interface 12D for communication with the UE 10 via one or more antennas. The eNB 12 is coupled via a data/control path 13 to the NCE 14. As a non-limiting example, the path 13 may be implemented as an S1 interface.

The NCE 14 includes a controller, such as a data processor (DP) 14A (e.g., a computer or one or more processors) and a computer-readable memory medium embodied as a memory (MEM) 14B that stores a program of computer instructions (PROG) 14C. As noted above, the NCE 14 is coupled via a data/control path 13 to the eNB 12. The eNB 12 may also be coupled to one or more other eNBs via data/control path 15, which may be implemented as an X2 interface, for example.

The RF interface 10D, 12D of the UE 10 and/or eNB 12 may comprise one or more transmitters, one or more receivers and/or one or more transceivers, as non-limiting examples. In other exemplary embodiments, the RF interface 10D, 12D of the UE 10 and/or eNB 12 may comprise one or more wireless interfaces and/or one or more communication components configured to perform unidirectional and/or bidirectional wireless communication with one or more other apparatus and/or devices (e.g., to receive and/or transmit a plurality of communications from/to multiple eNBs in accordance with CoMP procedures).

At least one of the PROGs 10C and 12C is assumed to include program instructions that, when executed by the associated DP 10A, 12A, enable the respective device to operate in accordance with the exemplary embodiments of this invention, as will be discussed below in greater detail. That is, the exemplary embodiments of this invention may be implemented at least in part by computer software executable by the DP 10A of the UE 10 and/or by the DP 12A of the eNB 12, or by hardware, or by a combination of software and hardware (and firmware).

For the purposes of describing the exemplary embodiments of this invention, the UE 10 may be assumed to also include a RS-UE processor 10E, and the eNB 12 may include a RS-BS processor 12E and a scheduler 12F. The RS-UE processor 10E may perform any of the operations described herein, such as in reference to FIG. 8. The RS-UE 10E may also be implemented as computer program instructions stored in PROG 10C and executed by the DP 10A. As a non-limiting example, the RS-BS 12E may include at least one processor or processing component configured to perform any of the actions described herein, such as in reference to FIG. 7. The scheduler 12F allows having legacy SRS and new SRS sequences on the same SRS symbol. The scheduler 12F and RS-BS 12E may also be combined into a single element, or may be further subdivided. The RS-BS 12E and/or scheduler 12F may also be implemented as computer program instructions stored in PROG 12C and executed by the DP 12A.

In general, the various embodiments of the UE 10 can include, but are not limited to, mobile nodes, mobile stations, mobile phones, cellular phones, personal digital assistants (PDAs) having wireless communication capabilities, mobile routers, relay stations, relay nodes, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B, 12B and 14B may be of any type suitable to the local technical environment and may be implemented using any suitable data storage technology, such as semiconductor-based memory devices, flash memory, magnetic memory devices and systems, optical memory devices and systems, fixed memory and removable memory, as non-limiting examples. The DPs 10A, 12A and 14A may be of any type suitable to the local technical environment, and may include one or more of general purpose computers, special purpose computers, microprocessors, digital signal processors (DSPs) and processors based on a multicore processor architecture, as non-limiting examples.

Figure 2:
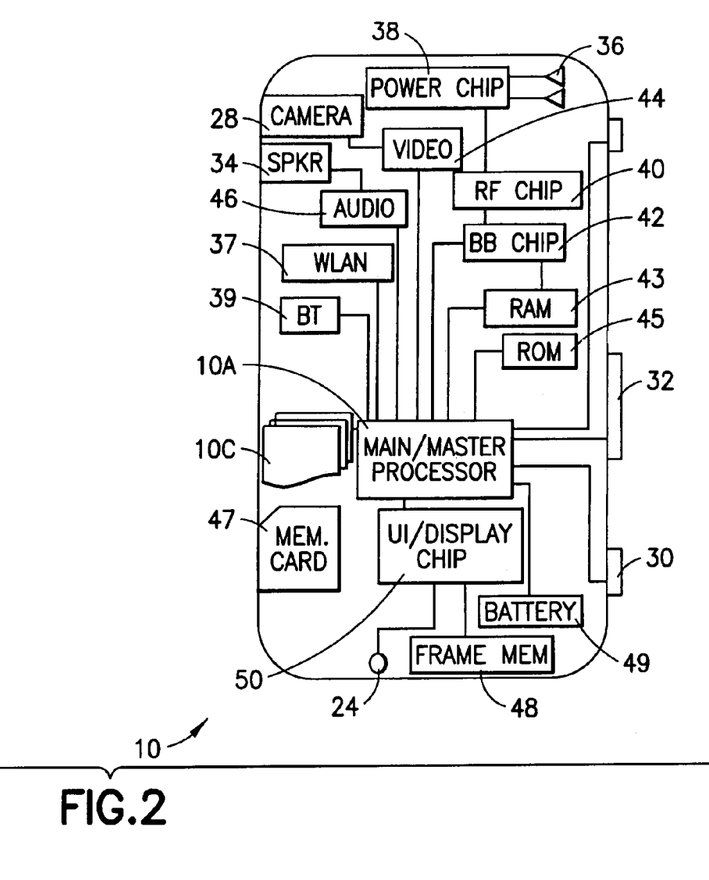
FIG. 2 shows a more particularized block diagram of an exemplary user equipment such as that shown in FIG. 1.

FIG. 2 illustrates further detail of an exemplary UE 10 in both plan view (left) and sectional view (right). Exemplary embodiments of the invention may be embodied in one or more combinations that include one or more function-specific components, such as those shown in FIG. 2. As shown in FIG. 2, the UE 10 includes a graphical display interface 20, a user interface 22 comprising a keypad, a microphone 24 and speaker(s) 34. In further exemplary embodiments, the UE 10 may also encompass touch-screen technology at the graphical display interface 20 and/or voice-recognition technology for audio signals received at the microphone 24. A power actuator 26 controls the UE 10 being turned on and/or off by the user. The UE 10 may include a camera 28, which is shown as forward facing (e.g., for video calls) but may alternatively or additionally be rearward facing (e.g., for capturing images and video for local storage). The camera 28 may be controlled by a shutter actuator 30 and optionally by a zoom actuator 32, which may alternatively function as a volume adjustment for the speaker(s) 34 when the camera 28 is not in an active mode.

Within the sectional view of FIG. 2 are seen multiple transmit/receive antennas 36 that are typically used for wireless communication (e.g., cellular communication). The antennas 36 may be multi-band for use with other radios in the UE. The operable ground plane for the antennas 36 may span the entire space enclosed by the UE housing, though in some embodiments the ground plane may be limited to a smaller area, such as disposed on a printed wiring board on which a power chip 38 is formed. The power chip 38 controls power amplification on the channels being transmitted on and/or across the antennas that transmit simultaneously, where spatial diversity is used, and amplifies received signals. The power chip 38 outputs the amplified received signal to the radio frequency (RF) chip 40, which demodulates and down-converts the signal for baseband processing. The baseband (BB) chip 42 detects the signal, which is then converted to a bit-stream and finally decoded. Similar processing occurs in reverse for signals generated in the UE 10 and transmitted from the UE 10.

Signals to and from the camera 28 pass through an image/video processor (video) 44, which encodes and decodes the image data (e.g., image frames). A separate audio processor 46 may also be present to control signals to and from the speakers (spkr) 34 and the microphone 24. The graphical display interface 20 is refreshed from a frame memory (frame mem) 48 as controlled by a user interface/display chip 50, which may process signals to and from the display interface 20 and/or additionally process user inputs from the keypad 22 and elsewhere.

Certain exemplary embodiments of the UE 10 may also include one or more secondary radios such as a wireless local area network radio (WLAN) 37 and/or a Bluetooth radio (BT) 39, which may incorporate one or more on-chip antennas or be coupled to one or more off-chip antennas. Throughout the UE 10 are various memories, such as a random access memory (RAM) 43, a read only memory (ROM) 45, and, in some exemplary embodiments, a removable memory such as the illustrated memory card 47. In some exemplary embodiments, the various programs 10C are stored on the memory card 47. The components within the UE 10 may be powered by a portable power supply such as a battery 49.

The aforesaid processors 38, 40, 42, 44, 46, 50, if embodied as separate entities in the UE 10 or the eNB 12, may operate in a master-slave relationship with respect to the main/master processor 10A, 12A. Exemplary embodiments of this invention need not be disposed in a central location, but may instead be disposed across various chips and memories as shown or disposed within another processor that combines some of the functions described above for FIG. 2. Any or all of these various processors of FIG. 2 may access one or more of the various memories, which may be on-chip with the processor or separate therefrom. Similar function-specific components that are directed toward communications over a network broader than a piconet (e.g., components 36, 38, 40, 42-45 and 47) may also be disposed in exemplary embodiments of the access node 12, which, in some exemplary embodiments, may include an array of tower-mounted antennas rather than the antennas 36 shown in FIG. 2.

Note that the various processors and/or chips (e.g., 38, 40, 42, etc.) described above may be combined into a fewer number of such processors and/or chips and, in a most compact case, may be embodied physically within a single processor or chip.

While described above in reference to memories, these components may generally be seen to correspond to one or more storage devices, storage circuits, storage components and/or storage blocks. In some exemplary embodiments, these components may comprise one or more computer-readable mediums, one or more computer-readable memories and/or one or more program storage devices.

While described above in reference to processors, these components may generally be seen to correspond to one or more processors, data processors, processing devices, processing components, processing blocks, circuits, circuit devices, circuit components, circuit blocks, integrated circuits and/or chips (e.g., chips comprising one or more circuits or integrated circuits).

Figure 3:
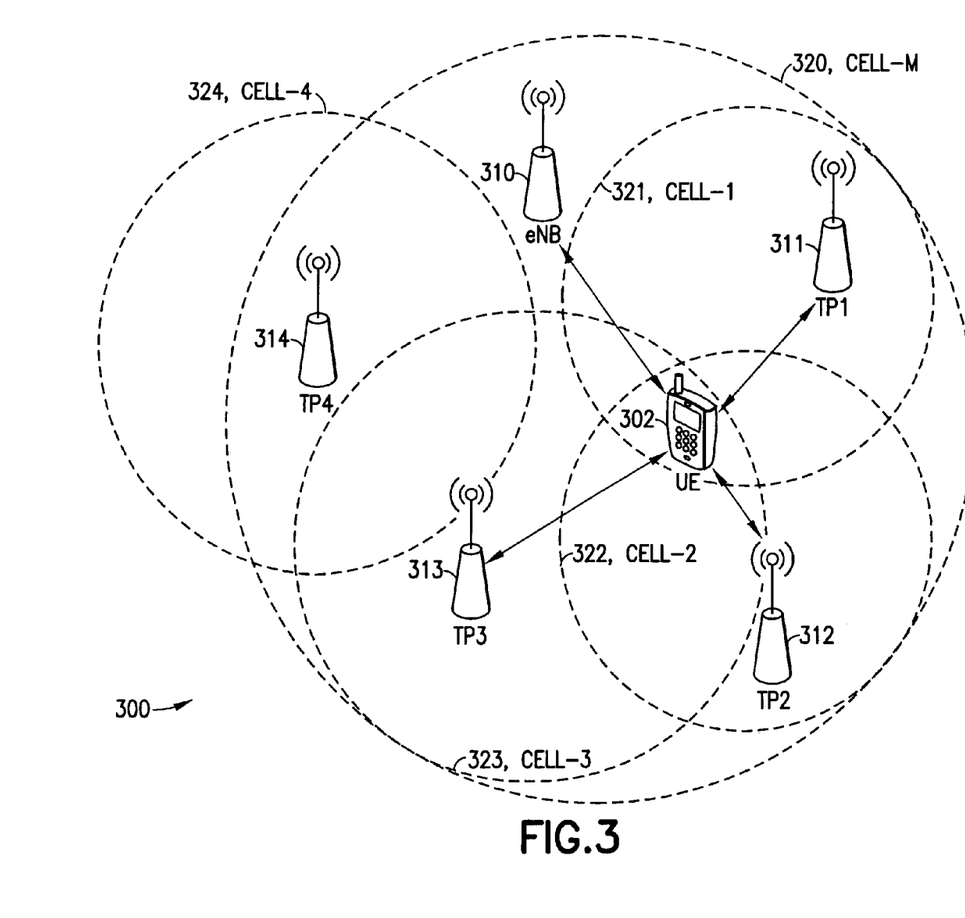
FIG. 3 depicts an exemplary CoMP system within which the exemplary embodiments of the invention may be implemented.

FIG. 3 depicts an exemplary CoMP system 300 within which the exemplary embodiments of the invention may be implemented. The system 300 includes at least one UE 302 and at least one eNB 310 (e.g., a serving eNB for the UE 302).

The eNB 310 defines a macro cell (cell-m) 320 of coverage. Within the macro cell 320 is at least one transmission point (TP1 311, TP2 312, TP3 313, TP4 314) coupled at least to the eNB 310 and, in some exemplary embodiments, to one another. Each transmission point defines a corresponding local cell of coverage (cell-1 321, cell-2 322, cell-3 323, cell-4 324) that may be entirely within the macro cell 320 or may overlap with a portion of the macro cell 320. As non-limiting examples, the transmission points may comprise RRHs or additional eNBs. In some exemplary embodiments, the transmission points are coupled to the eNB 310 to enable at least coordinated transmission to the UE 302. The one or more (at least one) local cells of coverage may also be referred to as hotspots, hotspot cells or local hotspots, as non-limiting examples.

The eNB 310 may be coupled to the at least one transmission point via at least one data and control path, which may be implemented as an X2 interface for the case of another logical base station or may be a direct eNB internal interface (e.g., an optical fiber connection) for connection to another type of transmission point such as at least one RRH, as non-limiting examples. Typically, the eNB 310 covers a single macro cell (cell-m 320) via one or more antennas.

The UE 302 is attached to the eNB 310 and communicates with the eNB 310 at least for UL control (PUCCH), uplink data (PUSCH), and DL control (PDCCH) channels. For CoMP reception, the UE 302 can receive a joint transmission (e.g., on a PDSCH) from any subset of eNB 310, TP1 311, TP2 312, TP3 313, and TP4 314. Note that a transmission point is defined as a co-located set of antennas. The transmission points may or may not be assigned a same cell-id. The transmission points may or may not belong to a same eNB (e.g., RRHs for eNB 310, a same serving eNB). As a non-limiting example, typically CoMP clusters are defined geographically to prevent and/or minimize overlap of macro cells or overlap of CoMP clusters, for example.

In some exemplary embodiments, each transmission point may include a controller, such as at least one data processor, at least one computer-readable memory medium (e.g., embodied as a memory) that stores a program of computer instructions, at least one suitable transmitter and at least one suitable receiver (e.g., at least one RF transceiver) operable for communication with the UE 302 via one or more antennas (typically several when MIMO operation is in use). In some exemplary embodiments, for single-cell operation the transmission points may be under complete control of a single eNB, although dispersed control is also possible. In further exemplary embodiments, there is generally a central unit to which several transmission points (e.g., RRHs) are connected. Thus, the transmission points and the macro eNB may be centrally controlled together. While the control is typically at the location of the macro eNB, in other exemplary embodiments it may be at a location that is connected to the eNB and/or the transmission points.

While discussed herein with respect to communication between a UE (e.g., UE 302) and an eNB (e.g., eNB 310), it should be understood that this is by way of convenience and for purposes of clarity, and thus should not be viewed as limiting the exemplary embodiments of the invention. In some exemplary embodiments, the UE may communicate with one or more transmission points, one or more transmission nodes, the eNB and/or any suitable combination thereof. Furthermore, any of these devices and/or logical entities may implement the exemplary embodiments of the invention as discussed herein. It should be appreciated that the exemplary embodiments described herein may be implemented for traditional macro-cell CoMP operation as well as operations having distributed antennas within a cell (e.g., enabled by RRHs).

Returning to a discussion of SRS, the SRSs increase overhead in wireless communication. Flexible allocation and control of SRS resources is mainly limited by physical resources of system both in time and frequency domains as well as by the SRS structure.

Another limitation is the amount of available reference symbols enabling efficient signal detection at receiver. Furthermore, any new methods being added into a system should be also backward compatible with existing standard releases (e.g., Rel-8 and Rel-9).

Figure 4:
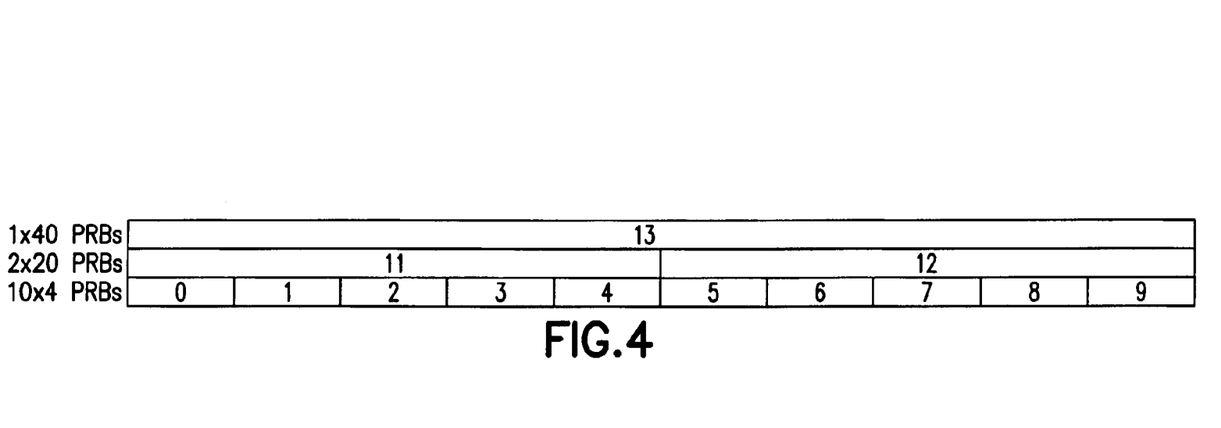
FIG. 4 shows an example of UL SRS bandwidth configurations for 10 MHz (megahertz) system BW, where total SRS bandwidth equals to 40 PRBs.

The current LTE SRS arrangement follows an "SRS-bandwidth tree" structure, where the legal starting positions as well as the supported SRS bandwidths are strictly limited (e.g., such that minimum SRS bandwidth is equal to 4 PRBs in all cases). There are few configurations available that are applicable to different system bandwidths and PUCCH region sizes. FIG. 4 shows an exemplary SRS bandwidth configuration supporting 13 different PRB allocations for the SRS with three SRS bandwidth options.

Current LTE Rel-8/9/10 has sounding capabilities of two frequency combs and 8 cyclic shifts in each of the combs. IFDMA with RPF=2 is used to provide intra-cell orthogonality for two sounding reference signals overlapping in frequency but having different SRS bandwidth allocated. The problem of the current SRS arrangement is that SRS allocation is quite inflexible in frequency. That is, frequency starting position as well as the SRS bandwidth flexibility is strictly limited.

One important limitation is the capability of multiplexing only two different, overlapping SRS BWs. One rather straightforward option is to extend RPF, e.g., to four from the current value of two. However, larger RPF values start to affect the channel estimation accuracy.

In Nissila et al., U.S. patent Ser. No. 13/289,118, filed on 4 Nov. 2011, entitled "DM RS Arrangements for Coordinated Multi-Point Communication", a RS sequence is defined (at least) over a maximum bandwidth of interest and narrower frequency parts of the RS sequence can be allocated for DM RS for UEs by the network. This enables extension of DM RS sequences with enhanced multiplexing flexibility for an existing system, although the DM RS arrangements rely on PRB allocations.

In an exemplary embodiment of the instant invention, a new SRS sequence is defined over the maximum bandwidth of interest, and cyclic shift is applied over the whole length of the sequence. Narrower frequency parts of the new SRS sequence (and the cyclic shifts thereof) can be allocated for UEs by the network. This enables those frequency parts of the new SRS sequence to have orthogonality irrespective of their PRB allocations. Relative to U.S. patent Ser. No. 13/289,118, differences between the exemplary embodiments herein include, for instance, that the selected sequences between DM RS and SRS are different, as the allowed frequency allocations are different. Further, differences in selected sequences between DM RS and SRS can occur because the allowed frequency allocations are different for DM RS and SRS, as SRS frequency allocations are a subset of PUSCH PRB allocations, and SRS applies also IFDM with RPF of 2. Also the base set of sequences (from which sequences are selected) can be different, due to RPF.

An exemplary embodiment of the instant invention provides a complementary SRS arrangement for the current LTE UL sounding. Non-limiting techniques include the following.

At least one new (e.g., cell-specific) SRS sequence may be defined for a given UL system bandwidth. The minimum length of the new SRS sequence corresponds to UL system bandwidth divided by the RPF of the new SRS. This is described in more detail below. The RPF corresponds to the number of used frequency pins divided by the total number of frequency pins. The application of the RPF in the time-domain corresponds to a frequency-domain decimation factor, which results (for an RPF of two or more) in a comb-like spectrum of frequency pins where an SRS spectrum has a signal occupying every other (for RPF=2) frequency pin. The term "frequency pin" refers to a subcarrier for SC-FDMA, and the term "frequency pin" is used instead of the term "subcarrier" as the term "subcarrier" is so strongly associated with OFDM. A frequency pin may be thought of as one "pin" (or "tooth") of a frequency comb for SC-FDMA. The total number of frequency pins corresponds to the (e.g., possible) UL system bandwidth.

A portion of the cell-specific SRS sequence is allocated for a given UE. The allocation contains number and position of frequency pins, transmission comb, and cyclic shift. The number and position of frequency pins, and typically the transmission comb, define a frequency comb for the given UE. IFDM in the particular case of SRS means that SRS is transmitted in every second subcarrier within the range of allocated subcarriers. This subcarrier allocation is defined in terms of PRBs—which in the case of SRS refer to multiples of 12 consecutive subcarriers in an example—and transmission comb, indicating whether odd or even subcarriers are selected. More specifically, an allocation might contain: 1) number and position of subcarriers (called frequency pins herein), where position is given as combination of PRBs (or "freqDomainPosition" in 3GPP TS 36.331, V 10.3.0 (2011-09)) and transmission comb (e.g., "transmissionComb" could be zero or one); 2) cyclic shift; and 3) transmission time/times with respect to UL frame structure.

An indication of the cell-specific SRS sequence and indication(s) of the allocation is transmitted to the UE. The UE transmits SRS according to the allocation received from eNB. Based on allocation (and other related configurations which indicate, e.g., the SRS sequence), the UE 10 generates and transmits SRS. In the SRS generation, the UE uses a portion of SRS sequence corresponding to at least a portion of the allocation. It is noted that the UE is configured to transmit in a subset of the cell-specific SRS resources. The UE can be configured to transmit periodically with a certain period and subframe offset. Alternatively, the UE can be triggered to transmit SRS in a first subframe containing these cell-specific SRS resources after receiving aperiodic SRS trigger and after UE processing time (e.g., about 4 ms, milliseconds).

In this document, it is said that the SRS sequence is cell-specific. This may not be the case in Rel-11 or other releases. In Rel-11, default selection of sequence is cell-specific, but this can be changed with UE-specific RRC configuration. The instant invention may be used with this technique, too.

In an exemplary embodiment, the RPF of the new SRS is greater than or equal to two. This choice guarantees backwards compatibility between the new SRS sequence and existing SRS sequence (corresponding to Rel-8/9/10 user equipment in the cell) as "another" frequency comb may be used for existing SRS sequence. That is, one frequency comb out of two (RPF=2) is used for a legacy SRS sequence and another comb is used for a new SRS sequence. This is described in more detail in reference to FIG. 6.

An exemplary use case for the new SRS sequence is provided below. An exemplary motivation behind the use case is that the new SRS sequence structure provides very flexible bandwidth allocation. On the other hand, the multiplexing capacity of the new SRS sequence is sufficiently high. This allows usage of the new SRS sequence as, e.g., auxiliary DM RS (e.g., in addition to "regular" DM RS) for the cell edge UEs:

Bandwidth and position of new SRS sequence (for DM RS) corresponds to that of PUSCH data.

Auxiliary DM RS can be configured via higher layers (e.g., using RRC signaling). When configured, auxiliary DM RS can be transmitted always on the subframes overlapping with the cell-specific SRS resources. That is, auxiliary DM RS is sent on one or more resources reserved currently for SRS. Put another way, SRS resources are used for additional DM RS purposes. This kind of operation is made feasible by the new sequences which allow flexible allocation of bandwidth. Allocation of auxiliary DM RS can be defined also in such that auxiliary DM RS is transmitted only when triggered with dynamic aperiodic SRS triggers. It should be noted that cell-specific SRS resources are not present in every UL subframe.

RPF, transmission comb, as well as the cyclic shift of "auxiliary DM RS" can be configured via higher layers. Alternatively/additionally, it is possible to derive certain parameters from the most recent UL grant (e.g., from the CSI field, or from the aperiodic SRS trigger). These parameters may be the same parameters as mentioned previously and may also include PRB allocation. An UL grant may contain multiple aperiodic SRS triggers, each corresponding to a different configuration of RPF, transmission comb and cyclic shift. A UE may also be configured to use UL grant CS index also when deriving cyclic shift for auxiliary DM RS.

An exemplary benefit of 'auxiliary DM RS' is that channel estimation performance can be optimized for the cell edge conditions without any additional reduction in the PUSCH payload (e.g., PUSCH payload is punctured anyway due to presence of cell-specific SRS resources).

Another as aspect of the invention is eNB scheduler operation, which allows having legacy SRS and new SRS sequences on the same SRS symbol:

eNB scheduler 12F keeps the legacy SRS and new SRS sequences on orthogonal resources by means of FDM (including IFDM) and TDM.

Figure 5:
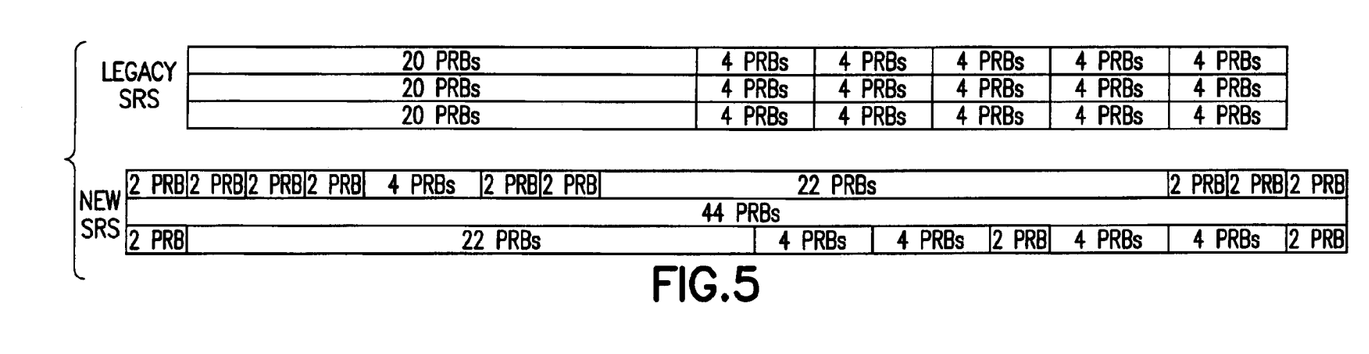
FIG. 5 illustrates a legacy SRS configuration and legacy SRS and new SRS multiplexed using the same (e.g., cell-specific) SRS sequence.

The new SRS sequence provides full flexibility in allocating the SRS sequence as shown in FIG. 5. The top portion of FIG. 5 shows an example of legacy SRS, while the bottom portion of FIG. 5 shows an example of legacy SRS and new SRS multiplexed using the same SRS resources. An assumption behind the example is that legacy UEs and SRS using the new SRS sequences have been allocated to separate IFDMA frequency combs (RPF=2 for both cases). Furthermore, cyclic shift separation among SRS allocated to the same frequency resources has been assumed (three UEs per frequency has been used with both legacy SRS and new SRS). That is, the rows represent different cyclic shifts. This figure assumes that three out of eight cyclic shifts are in use for each IFDMA comb. This results in six SRS signals per PRB (containing both IFDMA combs). It can be noted that the new SRS benefits from very flexible allocation of SRS even with legacy UEs in the system:

All SRS bandwidth options can be supported with the new SRS sequence (system bandwidth is basically the only limitation). This is shown in the bottom part of FIG. 5, where the bandwidth is 44 PRBs. SRS bandwidth can be also less than 4 PRBs. Although the SRS sequence design allows for any arbitrary SRS BW set (with granularity of almost a single subcarrier) it is of course reasonable to maintain SRS bandwidth allocation granularity, e.g., on PRB granularity or larger.

There is no limitation for the legal starting position for the new SRS sequence.

Allocation of SRS outside of the current SRS tree (40 PRBs in the current example) is also supported.

FIG. 5 illustrates one of the limitations of legacy SRS, in which the SRS tree has to be allocated in a semi-static way. Change of the SRS bandwidth would require re-configuration of all SRS in the cell. The instant proposal allows changes to the total bandwidth more dynamically.

Existing resource allocation schemes defined for PUSCH can be used when allocating resources for the new SRS sequences.

Figure 6:
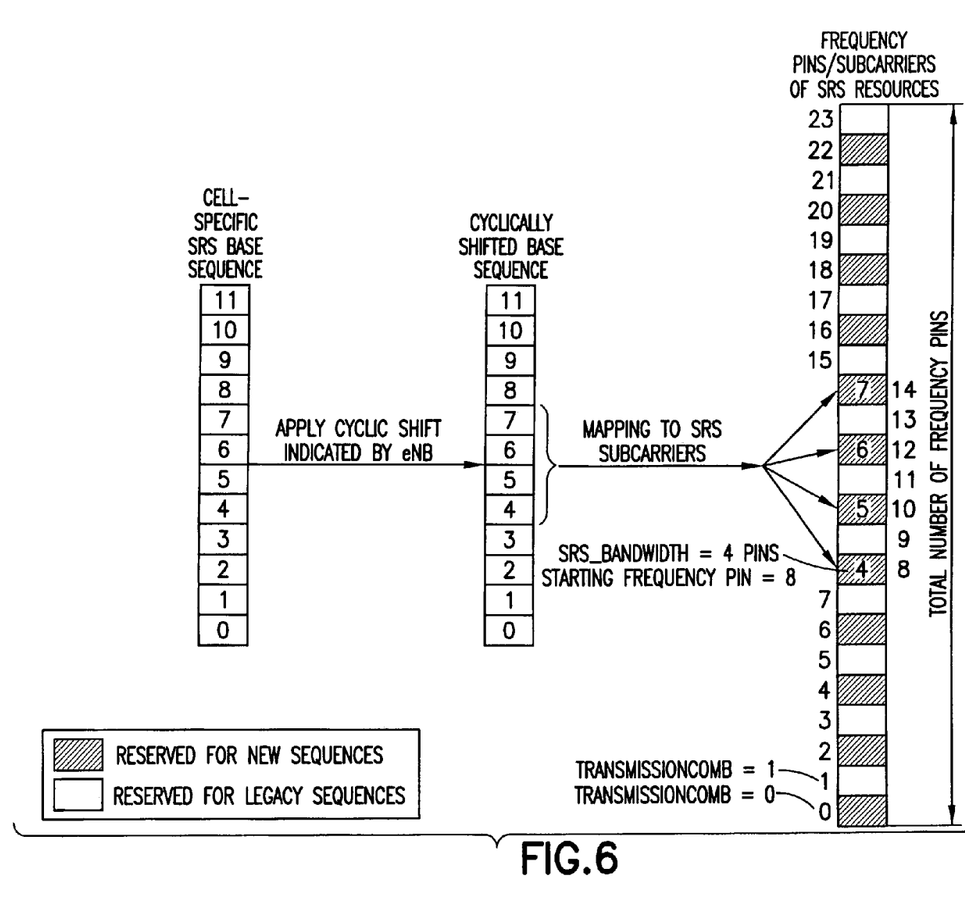
FIG. 6 is a diagram illustrating a mapping from a (e.g., cell-specific) base sequence to frequency pins of SRS resources.

Turning to FIG. 6, this figure is a diagram illustrating a mapping from a (e.g., cell-specific) base sequence to frequency pins of SRS resources. This mapping may be performed by a network (e.g., eNB 12 in this example) or a UE 10. In this example, even frequency pins (0, 2, 4, . . . , 22) are one "new" frequency comb (of a larger frequency comb equivalent to the total number of frequency pins) reserved for new SRS sequences, and odd frequency pins (1, 3, 5, . . . , 23) are one "legacy" frequency comb (of the larger frequency comb) reserved for legacy SRS sequences. That is, the scheduler 12F (e.g., in conjunction with the RS-BS processor 12E) performs scheduling, including allocation of SRS resources, of both legacy UEs (using an SRS sequence having a length equal to a length of the legacy frequency comb) and new UEs (using a new SRS sequence) to schedule the SRS resources as shown in FIG. 6. The scheduler 12F will allocate (e.g., assign) UE-specific portions of the new frequency comb or the legacy frequency comb, depending on the UE.

In an example, the new or legacy frequency comb may be selected by a transmission comb ("transmissionComb"), which is a parameter indicating a transmission comb offset. For instance, a transmission comb having a value of zero indicates that the new (in this example) UE is to start its "new" frequency comb at frequency pin zero. A transmission comb having a value of one indicates that the legacy (in this example) UE is to start its "legacy" frequency comb at frequency pin one.

A (e.g., cell-specific) base sequence is determined by the eNB 12 or an indication of the base sequence is received by the UE. The eNB 12/UE 10 applies a cyclic shift assigned to the UE to create the cyclically shifted base sequence. The eNB 12/UE 10, based on the allocation of SRS resources for the UE, maps elements 4-7 of the cyclically shifted base sequence to the frequency pins/subcarriers of the SRS resources. In this example, the allocation used to determine the frequency pins includes the SRS bandwidth ("SRS_Bandwidth" in FIG. 6, indicated as a number of pins; in this example, 4 pins are used) and the starting frequency pin (pin 8 in this example). The eNB 12/UE 10 may also use other allocation information to determine appropriate mapping to frequency pins, such as a transmission comb. In an example, the starting frequency pin and SRS bandwidth define a UE-specific frequency comb that is used to determine which elements of the cyclically shifted base sequence are assigned to the UE.

Regarding the length of the new SRS sequences, the lengths have to be at least the UL system bandwidth divided by the RPF (as illustrated by FIG. 6). Now, in LTE, there are a number of different system bandwidths and if one wants to use the same base sequences for all system bandwidths, the SRS sequence length has to equal or exceed the maximum system bandwidth divided by the RPF. So the length of the base sequence can be much longer than the previously mentioned lower limit. In an exemplary embodiment, only a portion of the whole sequence is used, from element 0 (zero) to an element equal to an adopted UL system bandwidth divided by RPF, and the other elements remain unused. The rationale behind defining longer base sequences than needed for a specific allocation is that with truncated versions of longer base sequences, better cubic metric and cross-correlation properties may be obtained than in the case the base sequence has the length of the absolute minimum.

Figure 7:
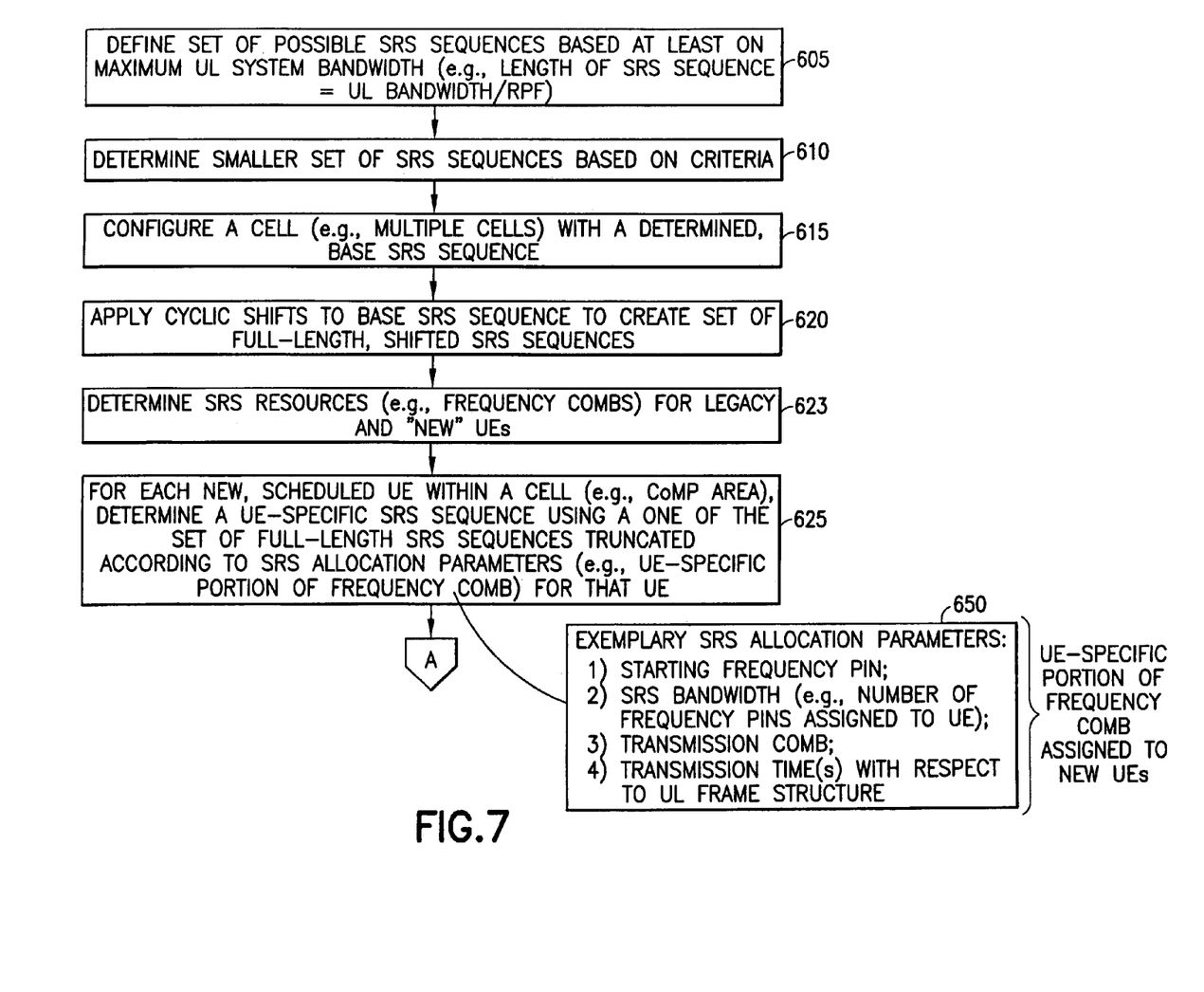
FIG. 7 is a flowchart of a method of flexible radio channel sounding performed by a network.

Referring now FIG. 7, a flowchart of a method of flexible radio channel sounding performed by a network, e.g. wireless network 1 of FIG. 1. The method may be performed, e.g., by the NCE/MME/SGW 14 and the eNB 12. The method may be performed by software (e.g., in PROG 12C and 14C) that is executed by a corresponding DP 12A, 14A, or may be performed by hardware (e.g., an integrated circuit), or some combination of these. Typically, blocks 605, 610, and 615 would be performed by the NCE/MME/SGW 14 so that the eNB 12 is configured with a cell-specific SRS sequence (in block 615), and then the eNB 12 would perform blocks 620-645. However, this is merely exemplary. For instance, as described above in reference to FIG. 3, a single base station (e.g., eNB 12) may control multiple transmission points such as RRHs, or there may be some combination of network controller(s) (e.g., NCE/MME/SGW 14) and eNBs 12 and RRHs controlled by eNBs. Based on configuration of the system, an eNB 12 could therefore perform all of the blocks shown in FIG. 7.

Definition of new SRS sequences resembles to a large extent the definition of DM RS sequences. Basically, a large set of sequences is defined (block 605). Sequences may be Zadoff-Chu sequences, extended Zadoff-Chu sequences, numerically searched sequences, etc. The sequence length corresponds to maximum system bandwidth or wider bandwidth (or alternatively, corresponds to the set of available system bandwidths). The minimum sequence length equals the maximum system bandwidth divided by RPF. From this large set of sequences, a smaller set of sequences is selected using certain criteria (block 610). For instance, by testing cubic metric (CM) values for all possible frequency allocations and picking the sequences with small CM values. From this smaller sequence set, the final sequence set is selected (block 610) by removing sequences causing the worst cross-correlations with other selected sequences.

Although SRS may use the same new sequence set as possibly defined for DM it may be beneficial to define a difference sequence set for SRS, as the DM test cases are different:

SRS does not need to have reasonable CM values with multi-cluster allocation as DM RS needs to have; and The sequence portions for the CM tests may differ between DM RS and SRS, as SRS employs RPF which DM RS does not, and SRS BW allocations do not need to be aligned with possible PUSCH data allocations as DM RS needs to be.

When defining the new SRS sequences, it is beneficial to optimize not only the cubic metric (CM) but also cross-correlations between the different sequences in given frequency allocation. This optimization of cross-correlations provides for reasonable (inter-cell) interference mitigation between the sequences assigned to different sequence groups. The optimization may take into account also the IFDM-component of the considered SRS sequences.

Sounding bandwidth is limited by PUCCH on the edges of system bandwidth and NRB2 parameter (this parameter defines the number of PRBs configured for PUCCH format 2/2a/2b) as with a conventional SRS definition.

Concerning the SRS frequency hopping pattern: One possibility is to use existing SRS frequency hopping pattern or define whole a new frequency hopping pattern suitable for new SRS positions and bandwidths.

In block 615, a cell is configured with one of the determined SRS sequences. Multiple cells may be configured in block 615. Also, a "cell" can include a CoMP area, e.g., as shown in cells 312, 322, and 323 of FIG. 3. Each cell then performs blocks 620-645. A single base station such as an eNB 12 may control multiple cells, and therefore a single eNB 12 may cause blocks 620-645 to be performed for each cell. For the sake of clarity, it is assumed below that a single base station performs blocks 620-645.

In block 620, a base station applies cyclic shifts to the configured (e.g., cell-specific) SRS sequence to create a set of full-length SRS sequences. In block 623, the base station determines SRS resources for legacy and "new" UEs (where the "new" UEs are UEs able to process the new SRS sequences described herein and legacy UEs use a legacy SRS sequence having a length equal to a length of a legacy frequency comb). As shown in FIG. 6, the SRS resources (as one large frequency comb) may be split between legacy and new UEs (e.g., as "new" and "legacy" frequency combs, from which UE-specific portions of the frequency combs may be allocated).

In block 625, for each new, scheduled UE within a cell (e.g., a CoMP area), a base station determines a UE-specific SRS sequence using a one of the set of full-length SRS sequences truncated according to at least some of the SRS allocation parameters for that UE. That is, at least some of the SRS allocation parameters define the truncated SRS sequence corresponding to a UE. Exemplary SRS allocation parameters are shown in block 650. These include the following: 1) Starting frequency pin; 2) SRS bandwidth assigned to UE (e.g., number of frequency pins assigned to UE); 3) Transmission comb; and 4) Transmission time(s) with respect to UL frame structure. A (UE-specific) frequency comb is defined in an example by a starting frequency pin, SRS bandwidth, and transmission comb. As described above in FIG. 6, the UE-specific portion of the "new" frequency comb is used to define which portion of the cyclically shifted base sequence is used by a UE. The UE-specific portion of the new frequency comb also defines the mapping of this portion of the cyclically shifted base sequence to UE-specific SRS resources. The transmission time(s) with respect to the UL frame structure define, e.g., when the UE is to transmit the UE-specific SRS resources. In block 630, the base station signals indications of a cell-specific SRS sequence, cyclic shift, and indication(s) of SRS allocation parameters (e.g., indication(s) of the user equipment-specific portion of the new frequency comb) to each new, scheduled UE.

Block 635 is optional, but is used if auxiliary DM RS is used. In block 635, the base station, for each of one or more UEs, determines a corresponding DM RS configuration using one of the set of full-length SRS sequences truncated according to DM RS parameters and signals to the DM RS parameters to the UE. Exemplary DM RS parameters may include some or all of the parameters shown in block 650. In one example, one or more of the DM RS parameters are determined at least in part on resource allocation for a physical shared channel (block 660). That is, in an exemplary embodiment, for auxiliary DM RS, the parameter values are assigned so as to match the PUSCH allocation (which is the requirement so that the SRS sequence can be used for DM RS purposes). As described above, not all of these DM RS parameters need to be signaled, and some of them may be inferred by the UE from other signaling (e.g., the DM RS for a UE uses the same cyclic shift as the SRS for the UE).

In block 638, the base station signals SRS allocation parameters to scheduled legacy UEs. As shown in FIG. 6, legacy and new UEs use different frequency combs. The legacy and new UEs also use different SRS sequences. In particular, the legacy UEs use an SRS sequence having a length equal to a length of the legacy frequency comb. In block 640, the base station communicates with each new and legacy scheduled UE (including new UEs using auxiliary DM RS) on uplink using corresponding scheduled SRS resources (for SRS and DM RS) and scheduled DM RS resources. In block 645, the base station uses received SRS, DM RS on SRS resources, and DM RS on DM RS resources. For instance, SRS may be used for channel quality determination to enable frequency-selective scheduling on the uplink, as is known. For DM RS, DM RS (on SRS resources and on DM RS resources) may be used for channel estimation for coherent demodulation, as is also known. It is noted that because the base station configured the SRS/DM RS to be used by the UEs, the base station can determine what the UEs sent in the corresponding SRS resources (occupied by SRS or DM RS).

Figure 8:
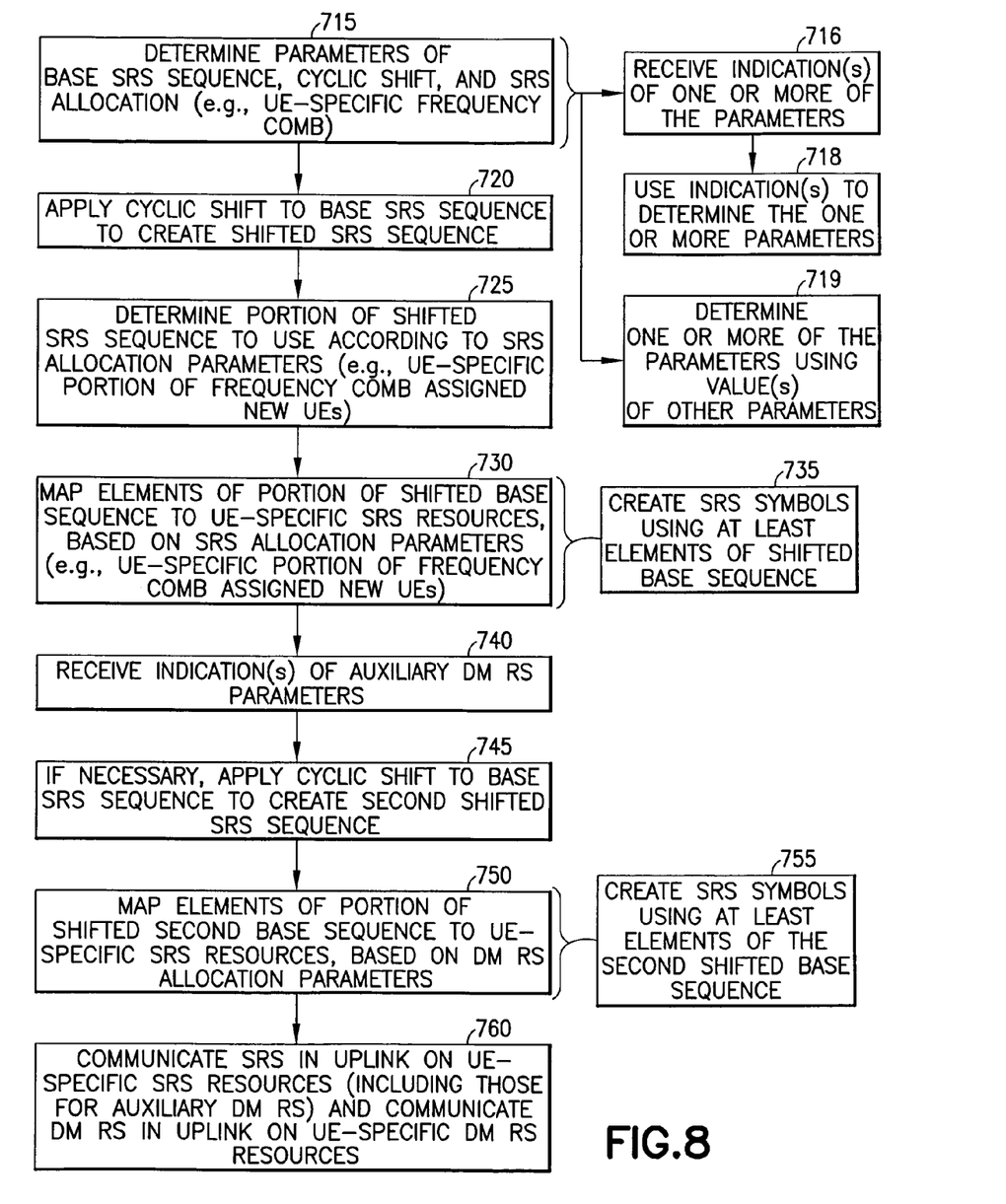
FIG. 8 is a flowchart of a method of flexible radio channel sounding performed by a UE.

FIG. 8 is a flowchart of a method of flexible radio channel sounding performed by a UE. The method may be performed, e.g., by a UE 10. The method may be performed by software (e.g., in PROG 10C) that is executed by DP 10A, or may be performed by hardware (e.g., an integrated circuit), or some combination of these. In block 715, the UE 10 determines the parameters of the base SRS sequence, cyclic shift, and SRS allocation (e.g., user equipment-specific portion of the new frequency comb). In FIG. 7, it was previously described that the parameters of base SRS sequence, cyclic shift, and SRS allocation (e.g., user equipment-specific portion of the new frequency comb) are communicated from the base station to the UE 10. However, not all of these need to be communicated. For instance, some of these could be determined using other information. Thus, in block 716, the UE receives one or more indications of these parameters, and these indications can include an indication of the base SRS sequence, an indication of the cyclic shift, or an indication of the SRS allocation. This block and any other block in FIGS. 7 and 8 where indications are said to be transmitted or received, the indications may be transmitted or received in a single message or in multiple messages. In block 718, the one or more indications are used to determine the one or more parameters. For instance, an indication of "5" for the base SRS sequence may mean location 5 in an array of sequences stored in memory. Also, some of the indications may be inferred (block 719), e.g., using value(s) of other parameters. In block 720, the UE 10 applies a cyclic shift as determined by the indication of the cyclic shift to the base SRS sequence to create a shifted SRS sequence. This is also shown in FIG. 6.

In block 725, the UE 10 determines a portion of the shifted SRS sequence to use according to SRS allocation parameters (e.g., UE-specific portion of the new frequency comb). This is described above in reference to FIG. 6. In claim 730, the UE 10 maps elements of the portion of the shifted base sequence to UE-specific SRS resources, based on SRS allocation parameters (e.g., UE-specific portion of the new frequency comb). This is also described above in reference to FIG. 6. One part of the mapping is shown in block 735, which is to create SRS symbols (to be transmitted on corresponding UE-specific SRS resources) using at least the elements of the shifted base sequence.

In block 740, the UE optionally receives one or more indications of auxiliary DM RS parameters. In block 745, the UE, if necessary, applies a cyclic shift (e.g., as indicated in block 740) to a (e.g., second) base SRS sequence to create a second shifted SRS sequence. In block 750, the UE maps elements of the portion of the shifted second base sequence to UE-specific SRS resources, based on DM RS allocation parameters (e.g., user equipment specific portion of the new frequency comb). Such mapping may include creating SRS symbols using at least elements of the second shifted base sequence (block 755). It is expected that the same SRS sequence will be used for both DM RS (on SRS) and SRS for new UEs. However, blocks 740, 745, and 750 provide the option of using different sequences for DM RS (on SRS) and SRS.

In block 760, the UE communicates SRS in uplink on UE-specific SRS resources (including those for auxiliary DM RS) and communicates DM RS in uplink on UE-specific DM RS resources. See FIG. 6 for an example for SRS, although this example could be similarly applied to DM RS sent using SRS resources.

Without limiting the above, a technical effect of these teachings is that they provide improved radio channel sounding. An additional technical effect is that they provide additional SRS configurations that are not limited to specific PRBs. A further technical effect is that additional DM RS may be provided to certain UEs by using SRS resources.

Embodiments of the present invention may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 10B, 12B, 14B or other device) that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
   at least one processor; and
   at least one memory including computer program code, the at least one memory and the computer program code being configured to, with the at least one processor, cause the apparatus at least to perform:
   determining a base sequence, a cyclic shift, and a user equipment-specific portion of a frequency comb;

applying the determined cyclic shift to the determined base sequence to create a shifted sequence; and selecting a portion of the shifted sequence as a user equipment-specific sounding reference sequence, where the selected portion of the shifted sequence corresponds to the user equipment-specific portion of the frequency comb.

2. The apparatus of claim 1, wherein determining further comprises receiving one or more of an indication of the base sequence, an indication of the cyclic shift, or an indication of the user equipment-specific portion of the frequency comb, and determining a corresponding base sequence, cyclic shift, or user equipment-specific portion of the frequency comb by using a corresponding received indication.

3. The apparatus of claim 1, wherein selecting further comprises selecting the portion of the shifted sequence at least by mapping the shifted sequence to the user equipment-specific portion of the frequency comb.

4. The apparatus of claim 1, wherein the user equipment-specific portion of the frequency comb is determined using at least a starting frequency pin and a bandwidth.

5. The apparatus of claim 4, wherein the frequency comb is a portion of a larger frequency comb corresponding to a set of sounding reference signal resources and the frequency comb is determined additionally using a transmission comb parameter that selects one of a number of possible starting positions in the larger frequency comb and selects a predetermined pattern corresponding to the transmission comb parameter of frequency pins in the larger frequency comb.

6. The apparatus of claim 5, wherein the frequency comb is a first frequency comb and wherein the larger frequency comb further has at least a second frequency comb able to be selected based on a value of the transmission comb parameter different from the value of the transmission parameter used for the first frequency comb, and where the first and second frequency combs occupy different portions of the larger frequency comb.

7. The apparatus of claim 5, wherein:
at least one of the starting frequency pin, the bandwidth, or the cyclic shift is determined by resource allocation for a physical shared channel;
the at least one memory and the computer program code are further configured to, with the at least one processor, cause the apparatus at least to perform:
transmitting, using the user equipment-specific sounding reference signal sequence, sounding reference signals in the user equipment-specific sounding reference signal resources; and
transmitting demodulation reference signals in demodulation reference signal resources, the demodulation reference signal resources separate from the user equipment-specific sounding reference signal resources.

8. The apparatus of claim 5, where the base sequence comprises at least one of: a Zadoff-Chu sequence, an extended Zadoff-Chu sequence, a truncated Zadoff-Chu sequence, or a computer-searched sequence.

9. The apparatus of claim 1, wherein the at least one memory and the computer program code are further configured to, with the at least one processor, cause the apparatus at least to perform:
mapping the user equipment-specific sounding reference signal sequence to user equipment-specific sounding reference signal resources; and
transmitting, using the user equipment-specific sounding reference signal sequence, sounding reference signals in the user equipment-specific sounding reference signal resources.

10. An apparatus, comprising:
at least one processor; and
at least one memory including computer program code, the at least one memory and the computer program code being configured to, with the at least one processor, cause the apparatus at least to perform:
assigning a cyclic shift and a user equipment-specific portion of a frequency comb to a user equipment, where the cyclic shift is for use by the user equipment to apply the cyclic shift to a determined base sequence to create a shifted sequence, and where the user equipment-specific portion of the frequency comb is for use by the user equipment at least to select a portion of the shifted sequence as a user equipment-specific sounding reference sequence; and
transmitting, from the apparatus to the user equipment, indications of the determined base sequence, the cyclic shift, and the user equipment-specific portion of the frequency comb.

11. The apparatus of claim 10, wherein the user equipment-specific portion of the frequency comb is determined using at least a starting frequency pin and a bandwidth, and wherein an indication of the user equipment-specific portion of the frequency comb comprises an indication of the starting frequency pin and an indication of the bandwidth.

12. The apparatus of claim 11, wherein the frequency comb is a portion of a larger frequency comb corresponding to a set of sounding reference signal resources and the frequency comb is determined additionally using a transmission comb parameter that selects one of a number of starting positions in the larger frequency comb and selects a predetermined pattern corresponding to the transmission comb parameter of frequency pins in the larger frequency comb.

13. The apparatus of claim 12, wherein the frequency comb is a first frequency comb and wherein the larger frequency comb further has at least a second frequency comb able to be selected based on a value of a transmission comb parameter different from the value of the transmission comb parameter used for the first frequency comb, and where the first and second frequency combs occupy different portions of the larger frequency comb.

14. The apparatus of claim 11, wherein:
at least one of the starting frequency pin, the bandwidth, or the cyclic shift is determined by resource allocation for a physical shared channel;
the at least one memory and the computer program code are further configured to, with the at least one processor, cause the apparatus at least to perform:
receiving sounding reference signals in the user equipment-specific sounding reference signal resources, the sounding reference signals created by the user equipment using the user equipment-specific sounding reference signal sequence; and
receiving demodulation reference signals in demodulation reference signal resources, the demodulation reference signal resources separate from the user equipment-specific sounding reference signal resources.

15. The apparatus of claim 10, where the determined base sequence has a length greater than or equal to a total number of frequency pins, for a selected uplink system bandwidth, divided by a repetition factor of a sounding reference signal.

16. The apparatus of claim 10, where the determined base sequence has a length greater than or equal to a total number of frequency pins, for a largest of a plurality of possible uplink system bandwidths, divided by a repetition factor of a sounding reference signal.

17. The apparatus of claim 10, wherein the at least one memory and the computer program code are further configured to, with the at least one processor, cause the apparatus at least to perform:

receiving, using user equipment-specific sounding reference signal resources corresponding to the user equipment-specific portion of the frequency comb, sounding reference signals in the user equipment-specific sounding reference signal resources.

18. The apparatus of claim 10, where assigning and transmitting are performed for at least a plurality of user equipment, and wherein at least assigned cyclic shifts transmitted to two or more of the plurality of user equipment are different.

19. The apparatus of claim 10, where:

assigning and transmitting are performed for at least a first user equipment assigned a first user equipment-specific portion of the frequency comb;

assigning and transmitting are performed for at least a second user equipment assigned a second user equipment-specific portion of the frequency comb;

the at least one memory and the computer program code are further configured to, with the at least one processor, cause the apparatus at least to perform:

receiving from the first user equipment sounding reference signals in sounding reference signal resources corresponding to the first user equipment-specific portion of the frequency comb, wherein the sounding reference signals from the first user equipment were determined at least in part using the corresponding user equipment-specific sounding reference signal sequence; and receiving from the second user equipment sounding reference signals in sounding reference signal resources corresponding to the second user equipment-specific portion of the frequency comb, wherein the sounding reference signals from the second user equipment were determined at least in part using the corresponding user equipment-specific sounding reference signal sequence.

20. The apparatus of claim 13, where:

assigning is performed for a plurality of first user equipment assigned different first user equipment-specific portions of the first frequency comb; and the at least one memory and the computer program code are further configured to, with the at least one processor, cause the apparatus at least to perform: assigning a plurality of second user equipment to different second user equipment-specific portions of the second frequency comb, wherein each of the second user equipment uses a predetermined base sequence for use for determining corresponding user equipment-specific sounding reference signal sequences, the predetermined base sequence having a length equal to a length of the second frequency comb.

21. A method, comprising:

determining by an apparatus a base sequence, a cyclic shift, and a user equipment-specific portion of a frequency comb;

applying by the apparatus the determined cyclic shift to the determined base sequence to create a shifted sequence; and selecting by the apparatus a portion of the shifted sequence as a user equipment-specific sounding reference sequence, where the selected portion of the shifted sequence corresponds to the user equipment-specific portion of the frequency comb.

22. The method of claim 21, wherein determining further comprises receiving one or more of an indication of the base sequence, an indication of the cyclic shift, or an indication of the user equipment-specific portion of the frequency comb, and determining a corresponding base sequence, cyclic shift, or user equipment-specific portion of the frequency comb by using a corresponding received indication.

23. The method of claim 21, wherein selecting further comprises selecting the portion of the shifted sequence at least by mapping the shifted sequence to the user equipment-specific portion of the frequency comb.

24. A computer program product comprising a non-transitory computer-readable medium bearing computer program code embodied therein for use with a computer, the computer program code comprising code for performing the method of claim 21.

25. A method, comprising:

assigning by an apparatus a cyclic shift and a user equipment-specific portion of a frequency comb to a user equipment, where the cyclic shift is for use by the user equipment to apply the cyclic shift to a determined base sequence to create a shifted sequence, and where the user equipment-specific portion of the frequency comb is for use by the user equipment at least to select a portion of the shifted sequence as a user equipment-specific sounding reference sequence; and transmitting, from the apparatus to the user equipment, indications of the determined base sequence, the cyclic shift, and the user equipment-specific portion of the frequency comb.

26. The method of claim 25, wherein the user equipment-specific portion of the frequency comb is determined using at least a starting frequency pin and a bandwidth, and wherein an indication of the user equipment-specific portion of the frequency comb comprises an indication of the starting frequency pin and an indication of the bandwidth.

27. The method of claim 25, where the determined base sequence has a length greater than or equal to a total number of frequency pins, for a selected uplink system bandwidth, divided by a repetition factor of a sounding reference signal.

28. The method of claim 25, where the determined base sequence has a length greater than or equal to a total number of frequency pins, for a largest of a plurality of possible uplink system bandwidths, divided by a repetition factor of a sounding reference signal.

29. A computer program product comprising a non-transitory computer-readable medium bearing computer program code embodied therein for use with a computer, the computer program code comprising code for performing the method of claim 25.

* * * * *